United States Patent
Guo et al.

(10) Patent No.: US 10,823,646 B1
(45) Date of Patent: Nov. 3, 2020

(54) METHOD FOR EVALUATING THE LONGITUDINAL DEFORMATION OF PROPPANT PACK

(71) Applicant: SOUTHWEST PETROLEUM UNIVERSITY, Chengdu, Sichuan (CN)

(72) Inventors: Jianchun Guo, Chengdu (CN); Youjing Duan, Chengdu (CN); Yuxuan Liu, Chengdu (CN); Jiandong Wang, Chengdu (CN); Chi Chen, Chengdu (CN); Dilin Wen, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/805,662

(22) Filed: Feb. 28, 2020

(30) Foreign Application Priority Data

Sep. 27, 2019 (CN) .......................... 2019 1 0925235

(51) Int. Cl.
| | |
|---|---|
| *G01N 1/28* | (2006.01) |
| *G01N 3/12* | (2006.01) |
| *G01N 3/62* | (2006.01) |

(52) U.S. Cl.
CPC .............. *G01N 1/286* (2013.01); *G01N 3/12* (2013.01); *G01N 3/62* (2013.01);
(Continued)

(58) Field of Classification Search
CPC ............ G01N 1/286; G01N 3/12; G01N 3/62; G01N 2203/0003; G01N 2203/0019; G01N 2203/0048; G01N 2203/0067
(Continued)

(56) References Cited

U.S. PATENT DOCUMENTS 9,790,422 B2 * 10/2017 McDaniel ................ C09K 8/80
2002/0125008 A1 9/2002 Wetzel et al.
(Continued)

FOREIGN PATENT DOCUMENTS

| CN | 101519961 A | 9/2009 |
|---|---|---|
| CN | 102606126 A | 7/2012 |

(Continued)

OTHER PUBLICATIONS

Bandara K. M. A. S. et al., Proppant Crushing Mechanisms Under Reservoir Conditions: Insights into Long-Term Integrity of Unconventional Energy Production, Natural Resources Research, 28(3): 1139-1161(2019).

(Continued)

*Primary Examiner* — Nathaniel T Woodward

(57) ABSTRACT

The invention discloses a method for evaluating the longitudinal deformation of proppant pack, mainly comprising the following steps: displace the proppant evenly on one steel sheet and cover the proppant with another same steel sheet; place pistons on the outer surface of two steel sheets respectively to form a test unit; place the test unit on fracture conductivity tester, compact the proppant pack at a pressure of 0.6 MPa, measure the width between the two steel sheets at the four corners of the steel sheet, and calculate the average results; install the left and right displacement meters, increase the closure pressure from 6.9 MPa to 69 MPa with an increment of 6.9 MPa/time by pressure control system, record the readings of the left and right displacement meters after the pressure is increased each time and the meter reading is stable, and work out the total deformation of the experimental equipment and the proppant; make a curve chart of the relationship between pack thickness and pressure, and characterize the proppant pack deformation with Young's modulus. The evaluation method disclosed in
(Continued)

the present invention makes up the technical gap in the study of proppant pack deformation in the prior art.

6 Claims, 14 Drawing Sheets

(52) U.S. Cl.
CPC ........... *G01N 2203/0003* (2013.01); *G01N 2203/0019* (2013.01); *G01N 2203/0048* (2013.01); *G01N 2203/0067* (2013.01)

(58) Field of Classification Search
USPC .......................................................... 73/1.01
See application file for complete search history.

(56) References Cited

U.S. PATENT DOCUMENTS

| | | | |
|---|---|---|---|
| 2008/0179057 A1 | 7/2008 | Dawson | |
| 2008/0182762 A1 | 7/2008 | Huang et al. | |
| 2014/0124200 A1 | 5/2014 | Fournier | |
| 2015/0068747 A1* | 3/2015 | Hwang | C09K 8/685 166/280.2 |
| 2015/0101808 A1* | 4/2015 | Saini | C09K 8/68 166/280.2 |
| 2015/0232742 A1 | 8/2015 | Parse et al. | |
| 2015/0307773 A1 | 10/2015 | Hulseman et al. | |
| 2016/0326859 A1* | 11/2016 | Crews | E21B 41/0035 |
| 2017/0121594 A1 | 5/2017 | Baleno et al. | |
| 2017/0247995 A1* | 8/2017 | Crews | E21B 43/17 |
| 2018/0230363 A1 | 8/2018 | McDaniel | |
| 2019/0203109 A1* | 7/2019 | Shalagina | E21B 43/267 |

FOREIGN PATENT DOCUMENTS

| | | |
|---|---|---|
| CN | 102749436 A | 10/2012 |
| CN | 204294863 U | 4/2015 |
| CN | 105134186 A | 12/2015 |
| CN | 105510165 A | 4/2016 |
| CN | 106566524 A | 4/2017 |
| CN | 108386179 A | 8/2018 |
| CN | 109490155 A | 3/2019 |
| CN | 109751032 A | 5/2019 |
| CN | 109763806 A | 5/2019 |
| CN | 109804039 A | 5/2019 |

OTHER PUBLICATIONS

Lu Yi-Yu et al., Experimental Study of Deformation and Seepage Characteristics of Proppant under Cyclic Loading, Rock and Soil Mechanics, 38(1), 2017, 8 pages.

Li Yong-Ming et al., Theoretical Model and Application of Secondary Sand Fracturing, Xinjiang Petroleum Geology, 31(2): 190-193, 2010.

First Office Action in Chinese Application No. 201910925235.4 dated Jan. 7, 2020, 9 pages.

* cited by examiner

METHOD FOR EVALUATING THE LONGITUDINAL DEFORMATION OF PROPPANT PACK

CROSS-REFERENCE TO RELATED APPLICATION

This application claims priority to Chinese Patent Application No. 201910925235.4, filed on Sep. 27, 2019, the contents of which are incorporated herein by reference in their entirety.

TECHNICAL FIELD

The present invention relates to the technical field of oil and gas development, in particular to a method for evaluating the longitudinal deformation of proppant pack.

BACKGROUND

After the fracturing operation is completed, the propped fracture is affected by the closure pressure. The fracture conductivity will be reduced by geometric shrinkage of proppant particle, reduction of space in the proppant, proppant crushing and fines migration. In hydraulic fracturing, the conductivity is the key factor to evaluate the flow capacity of the channel. The fracture width is the main parameter to calculate the conductivity. The ideal proppant must resist deformation and embedment to maintain fracture width and conductivity. However, in practice, it is impossible to achieve this even if proper proppant is selected. At present, most of the studies on proppant pack are based on the influence of proppant embedment on fracture conductivity, while few experiments consider the deformation rules of proppant pack alone. Due to the unclear deformation rules of proppant pack, the calculation of fracture width is inaccurate, and the conductivity prediction is biased. The present invention will analyze the deformation characteristics of proppant pack and main controlling factors by experimental research on the deformation of proppant pack, and provide a basis for the prediction of fracture conductivity.

SUMMARY

The purpose of the present invention is to provide a method for evaluating the longitudinal deformation of proppant pack in view of the current absence of experimental research in the prior art that independently focuses on the deformation rules of proppant pack.

The method for evaluating the longitudinal deformation of proppant pack disclosed in the present invention comprises the following steps:
Step 1: Weigh the proppant with total mass $m_c$, use electric sieve shaker and 20-mesh, 30-mesh, 40-mesh, 50-mesh, 70-mesh and 100-mesh screens to screen the proppant by particle size, and record the particle size distribution before pressing the proppant;
Step 2: Displace the proppant evenly on one steel sheet and cover the proppant with another same steel sheet; place pistons on the outer surface of two steel sheets respectively to form a test unit;
Step 3: Place the test unit on fracture conductivity tester, turn on the power supply, compact the proppant pack by manually applying a pressure of 0.5 to 0.7 MPa (preferably 0.6 MPa), measure the width between two steel sheets at the four corners of the steel sheet, and average the results;
Step 4: Install the left and right displacement meters, then reset the data on the displacement display, and close the oil return valve to make the pump turned on;
Step 5: Increase the closure pressure from 6.9 MPa to 69 MPa with an increment of 6.9 MPa/time by the pressure control system of the fracture conductivity tester, record the readings of the left and right displacement meters after the pressure is increased each time and the meter reading is stable, and work out the total deformation of the experimental equipment and the proppant;
Step 6: After pressurizing to 69 MPa and recording the data, open the oil return valve to release the pressure, remove the test unit, screen the proppant by particle size with electric sieve shaker and 20-mesh, 30-mesh, 40-mesh, 50-mesh, 70-mesh and 100-mesh screens again, and record the particle size distribution of pressed proppant;
Step 7: Equipment calibration: In the case where no proppant is displaced between the two steel sheets, repeat the proppant deformation experiment, increase the closure pressure from 6.9 MPa to 69 MPa with an increment of 6.9 MPa/time, record the readings of the left and right displacement meters after the pressure is increased each time and the meter reading is stable, work out the deformation of experimental equipment, and obtain the deformation of proppant pack by subtracting the deformation of the experimental equipment from the total deformation of the experimental equipment and the proppant from obtained in Step 5;
Step 8: Make a curve chart of the relationship between pack thickness and pressure after the equipment calibration, and find that the curve of the pack thickness with the pressure is a straight line. Therefore, Young's modulus is adopted to characterize the proppant pack deformation. The calculation formula of Young's modulus is as follows:

$$E = \frac{\sigma}{\varepsilon}$$

Wherein, E refers to Young's modulus, in MPa, $\sigma$ refers to stress to the proppant pack, in MPa, and $\varepsilon$ refers to strain of the proppant pack;
Step 9: Calculate the proppant crushing ratio with the following formula:

$$\eta = \frac{m_p}{m_c} \times 100\%$$

Wherein, refers to proppant crushing ratio, $m_p$ refers to mass of crushed proppant, in g, and $m_c$ refers to total mass of proppant, in g;

During the process of pressing, the large particles in the proppant are crushed, and the mass of the large particles is reduced after pressing. The mass $m_p$ of the crushed proppant is equal to the sum of the difference of the mass of all large particles in the proppant before and after pressing.

In Step 1 of the method, change the total mass $m_c$ of the weighed proppant, and conduct the following Steps 2 to 9 to study the longitudinal deformation rule of proppant pack under different proppant concentrations.

Compared with the prior art, the present invention has the following beneficial effects:

First, the present invention provides a method for evaluating the longitudinal deformation of the proppant pack, and finds that the relationship between the thickness of the proppant pack and the pressure tends to be linear. Therefore, the Young's modulus is adopted to characterize the proppant pack and calculate specific values. This method makes up for the lack of research and evaluation methods for proppant deformation in the prior art.

Second, the steel sheet is used in the evaluation method. The steel sheet can be regarded as a rock plate with higher strength and hardness. It will be still embedded under the action of higher closure pressure, but the degree of embedment will be reduced, reducing the impact of embedment on the deformation of proppant pack. The main instrument used is the existing fracture conductivity tester, which is easy to operate.

Other advantages, objectives and characteristics of the present invention will be partly embodied by the following description, and partly understood by those skilled in the art through research and practice of the present invention.

DETAILED DESCRIPTION

In the following detailed description of the preferred embodiments of the present invention, reference is made to the accompanying drawings. It is to be understood that the preferred embodiments described herein are only used to illustrate and interpret the present invention and are not intended to limit the present invention.

Ceramic particle and quartz sand are widely used as proppant because of their good sphericity, high strength and low cost. Therefore, representative ceramsite and quartz sand are selected for experiments.

Due to the high strength of the steel sheet, the purpose of using the steel sheet in the experiment is not to consider the influence of the deformation of the steel sheet; however, in practice the steel sheet still has a large deformation after be pressed, and other experimental equipment has different degrees of deformation. Since the deformation of the equipment has a great influence and the actual pack thickness cannot be calculated accurately by the existing data, calibration experiment is required.

I. Calibration of Experimental Equipment

Figure 1:
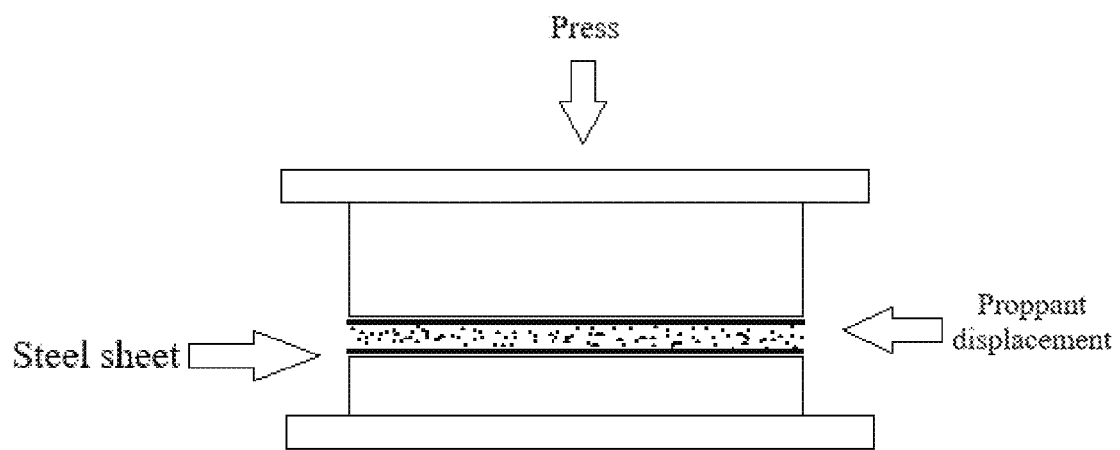
FIG. 1. Schematic Diagram of Proppant Displacement and Experimental Equipment.
Figure 2:
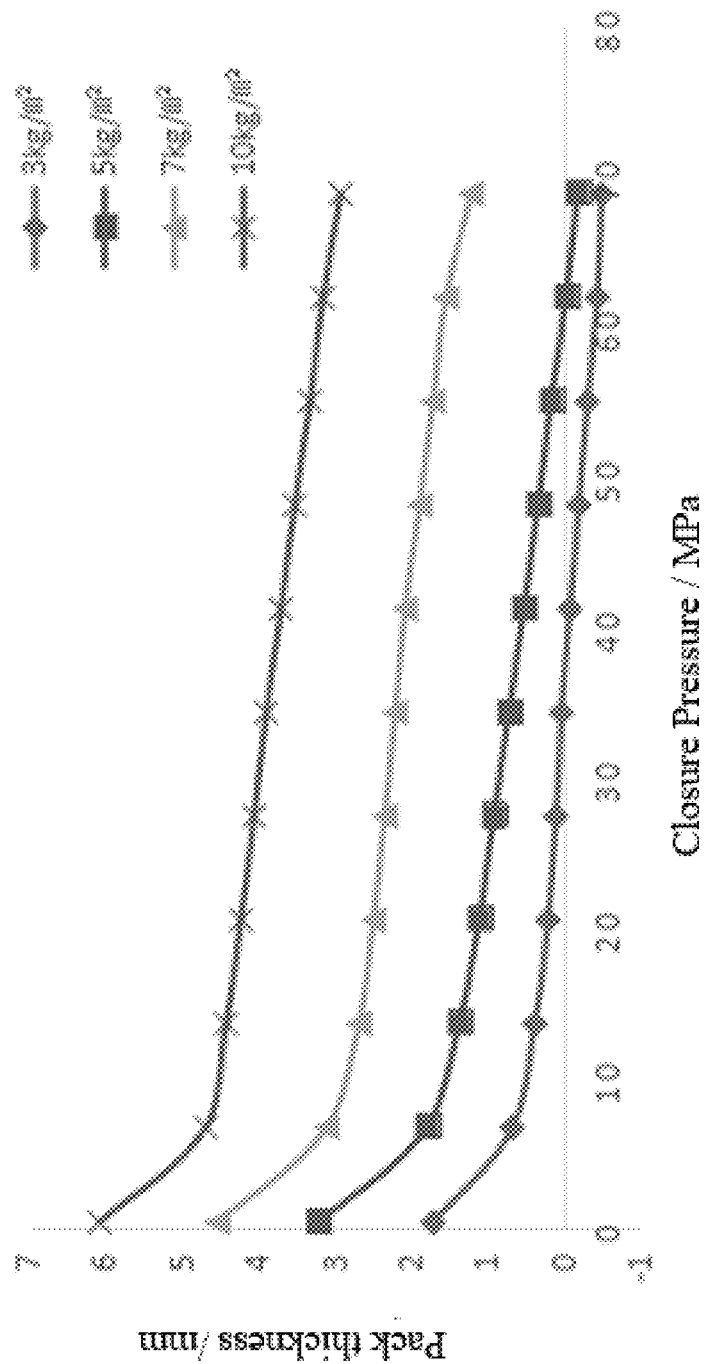
FIG. 2. Curve of Relationship between the Thickness of 20/40-mesh Ceramsite Proppant Pack and the Pressure before Equipment Calibration.

20/40-mesh ceramsite is taken as an example. At the beginning of the experiment, equipment deformation was not considered in the calibration, and only the thickness of the steel sheet after compaction is subtracted. As a result, the fracture width after the final correction is negative when the proppant concentration is small and the pressure is large, as shown in FIG. 2, which is obviously not in line with the actual situation. Therefore, it is necessary to test the deformation of equipment other than proppant.

As for error analysis, first of all, the purpose of placing steel sheets on and under the proppant pack is not to consider the proppant embedment, but in practice the proppant will embed into the steel sheet, which is one of the reasons for the calculation error. Second, the rubber gasket in the equipment to be installed will be slightly higher than the equipment after it is installed, and is deformed slightly under lower pressure, but still higher than the equipment, and when the pressure is increased to 69 MPa, the rubber gasket will be deformed greatly, leading to calculation error. Third, the equipment deformation under high pressure is not considered. In conclusion, the calculation results are not accurate. The proppant particle is embedded in the steel sheet slightly, and it cannot be seen clearly by the naked eye, so the proppant embedmenterror is not considered in the study of proppant pack deformation in this experiment.

In order to avoid excessive error, the equipment is calibrated, the proppant deformation experiment is repeated without ceramsite added between two steel sheets, the pressure is also increased to 69 MPa with an increment of 6.9 MPa/time, and the reading of the displacement meter is recorded after the pressure is increased each time and the meter reading is stable. Refer to Table 1 for the test data of experimental equipment deformation with pressure. The actual deformation of proppant pack is obtained by subtracting the experimental equipment deformation from the total deformation of the experimental equipment and the proppant obtained in Step 5.

TABLE 1

Deformation Data of Experimental Equipment under Pressure

| Pressure/ MPa | Left displacement/mm | Right displacement/mm | Average/ mm | Measured width/mm |
|---|---|---|---|---|
| 0.6 | 0 | 0 | 0 | 17.7925 |
| 6.9 | 1.2689 | 1.276 | 1.27245 | 16.52005 |
| 13.8 | 1.604 | 1.605 | 1.6045 | 16.188 |
| 20.7 | 1.778 | 1.7685 | 1.77325 | 16.01925 |
| 27.6 | 1.8964 | 1.8612 | 1.8788 | 15.9137 |

TABLE 1-continued

Deformation Data of Experimental Equipment under Pressure

| Pressure/ MPa | Left displacement/mm | Right displacement/mm | Average/ mm | Measured width/mm |
|---|---|---|---|---|
| 34.5 | 1.9878 | 1.946 | 1.9669 | 15.8256 |
| 41.4 | 2.0805 | 2.0354 | 2.05795 | 15.73455 |
| 48.3 | 2.1503 | 2.1004 | 2.12535 | 15.66715 |
| 55.2 | 2.2086 | 2.1568 | 2.1827 | 15.6098 |
| 62.1 | 2.266 | 2.2149 | 2.24045 | 15.55205 |
| 69 | 2.3217 | 2.2717 | 2.2967 | 15.4958 |

II. After the calibration of the experimental equipment, the change rules of proppant pack thickness are as follows:

(1) Single Ceramsite

Figure 3:
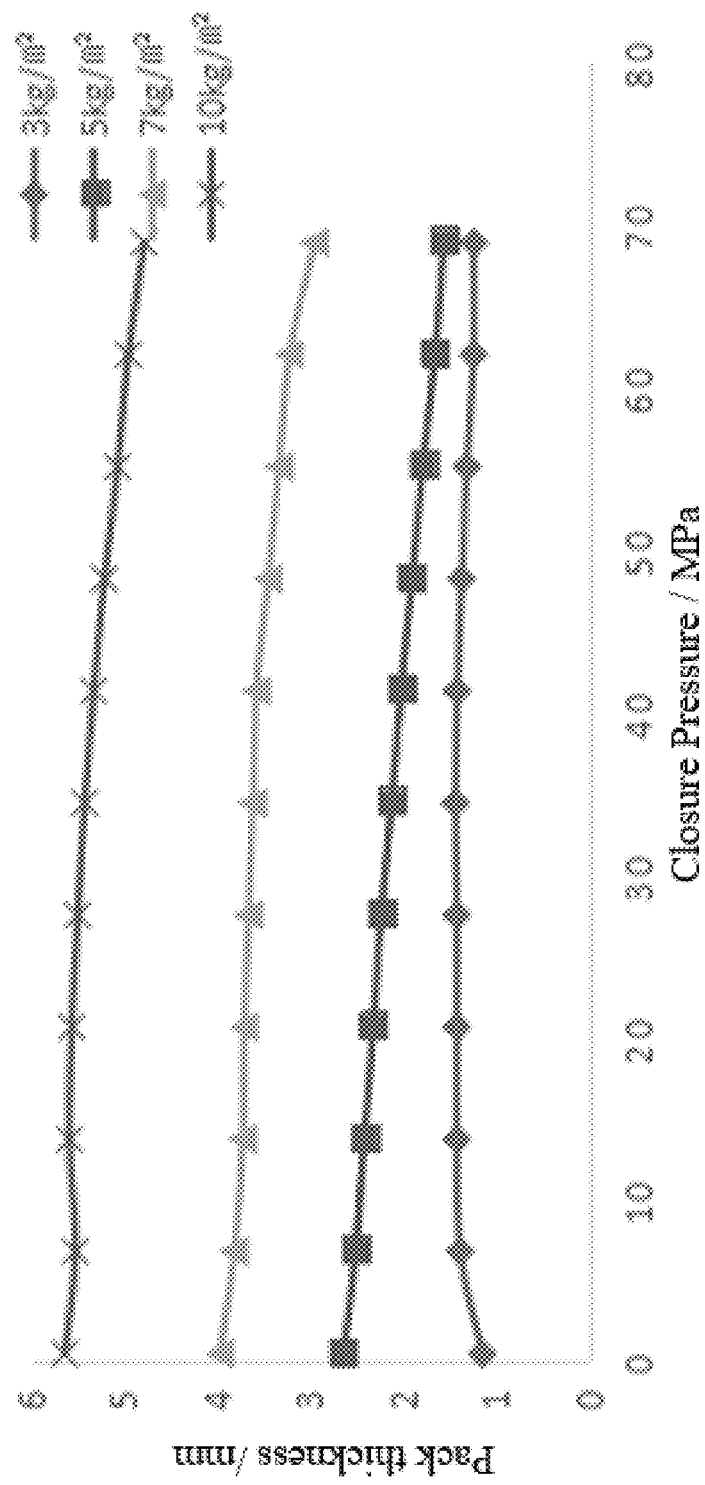
FIG. 3. Curve of Relationship between the Thickness of 20/40-mesh Ceramsite Proppant Pack and the Pressure after Experimental Equipment Calibration.
Figure 4:
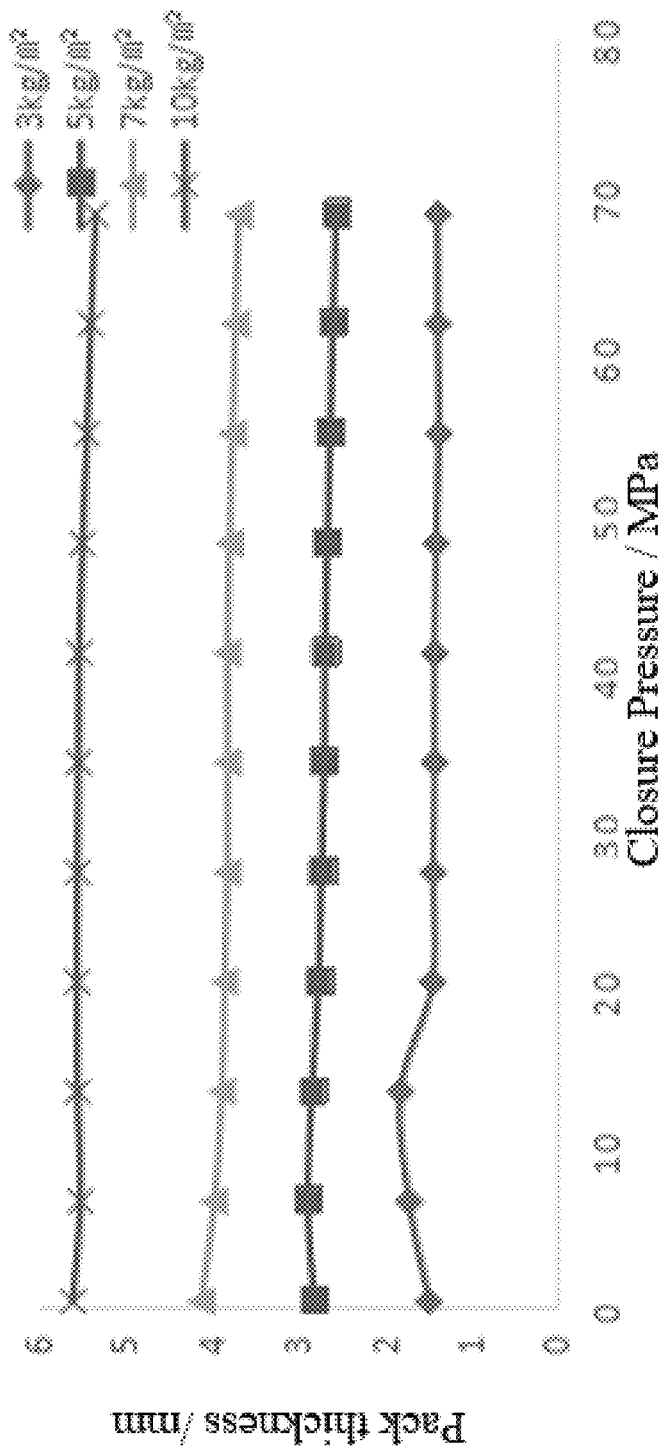
FIG. 4. Curve of Relationship between the Thickness of 30/50-mesh Ceramsite Proppant Pack and the Pressure after Experimental Equipment Calibration.
Figure 5:
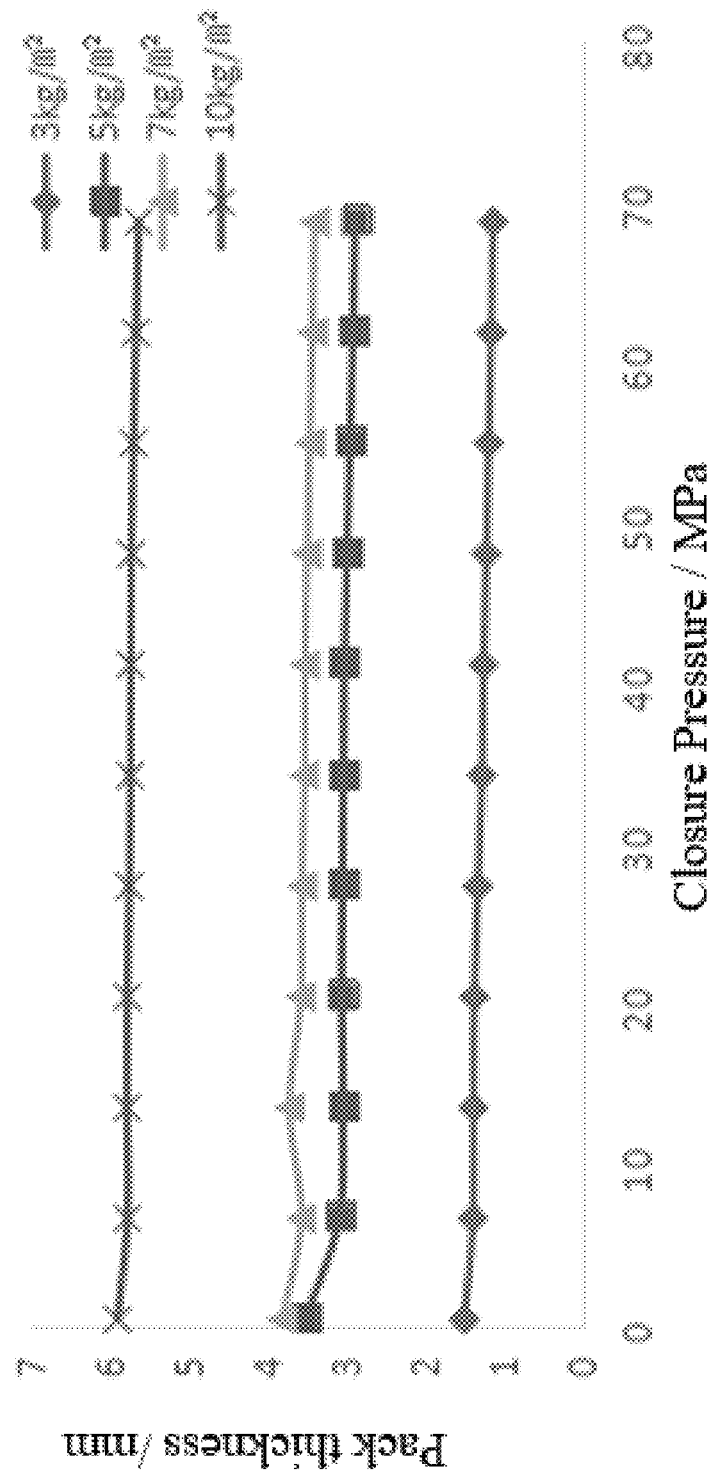
FIG. 5. Curve of Relationship between the Thickness of 40/70-mesh Ceramsite Proppant Pack and the Pressure after Experimental Equipment Calibration.

In addition to the influence of the deformation of the experimental equipment on the data, the change rule of the fracture width with different proppant concentrations of 20/40-mesh ceramsite proppant is shown in FIG. 3, the relationship between the thickness of 30/50-mesh ceramsite proppant and the pressure is shown in FIG. 4, and the relationship between the thickness of 40/70-mesh ceramsite proppant and the pressure is shown in FIG. 5.

(2) Mixed Ceramsite

Figure 6:
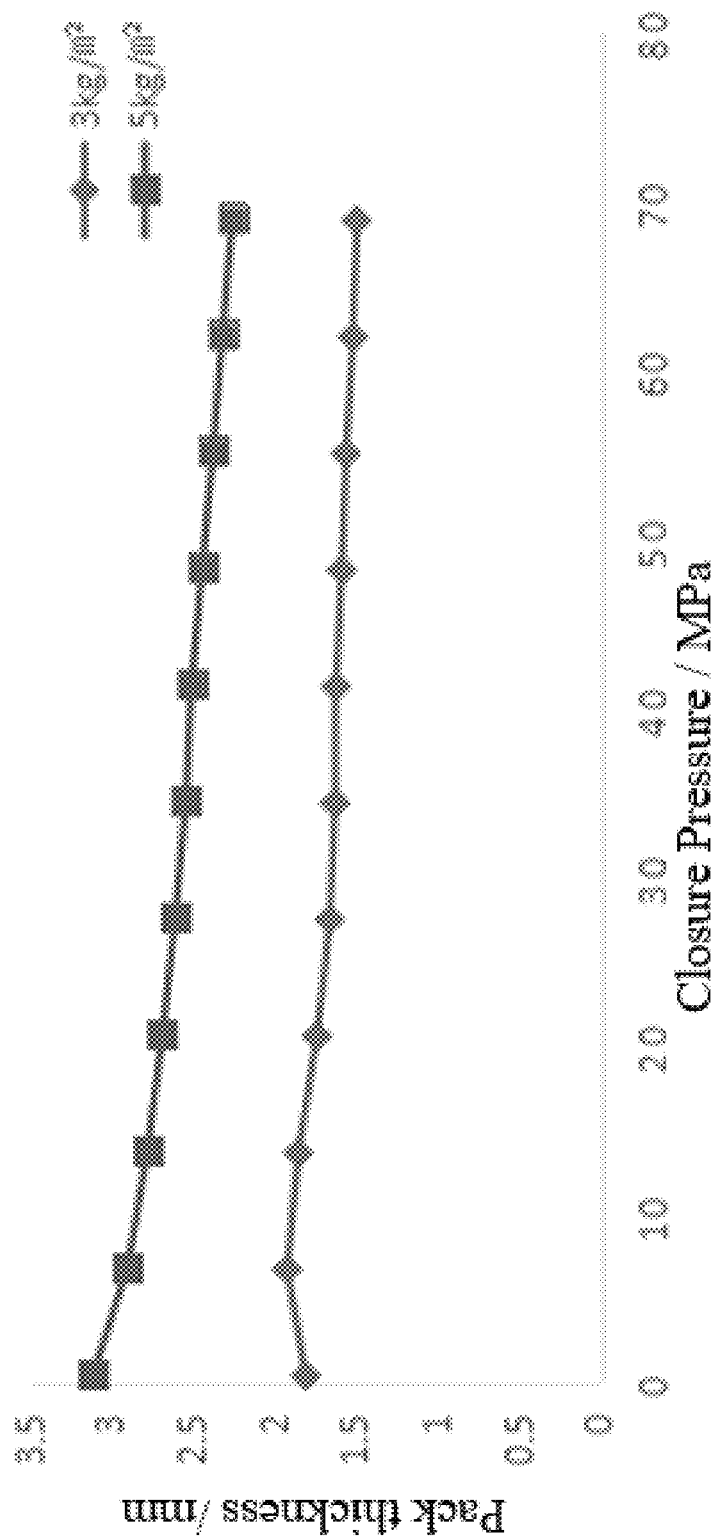
FIG. 6. Curve of Relationship between the Thickness of 1:1 Mixture of 20/40-mesh and 30/50-mesh Ceramsite Proppant Pack and the Pressure after Experimental Equipment Calibration.
Figure 7:
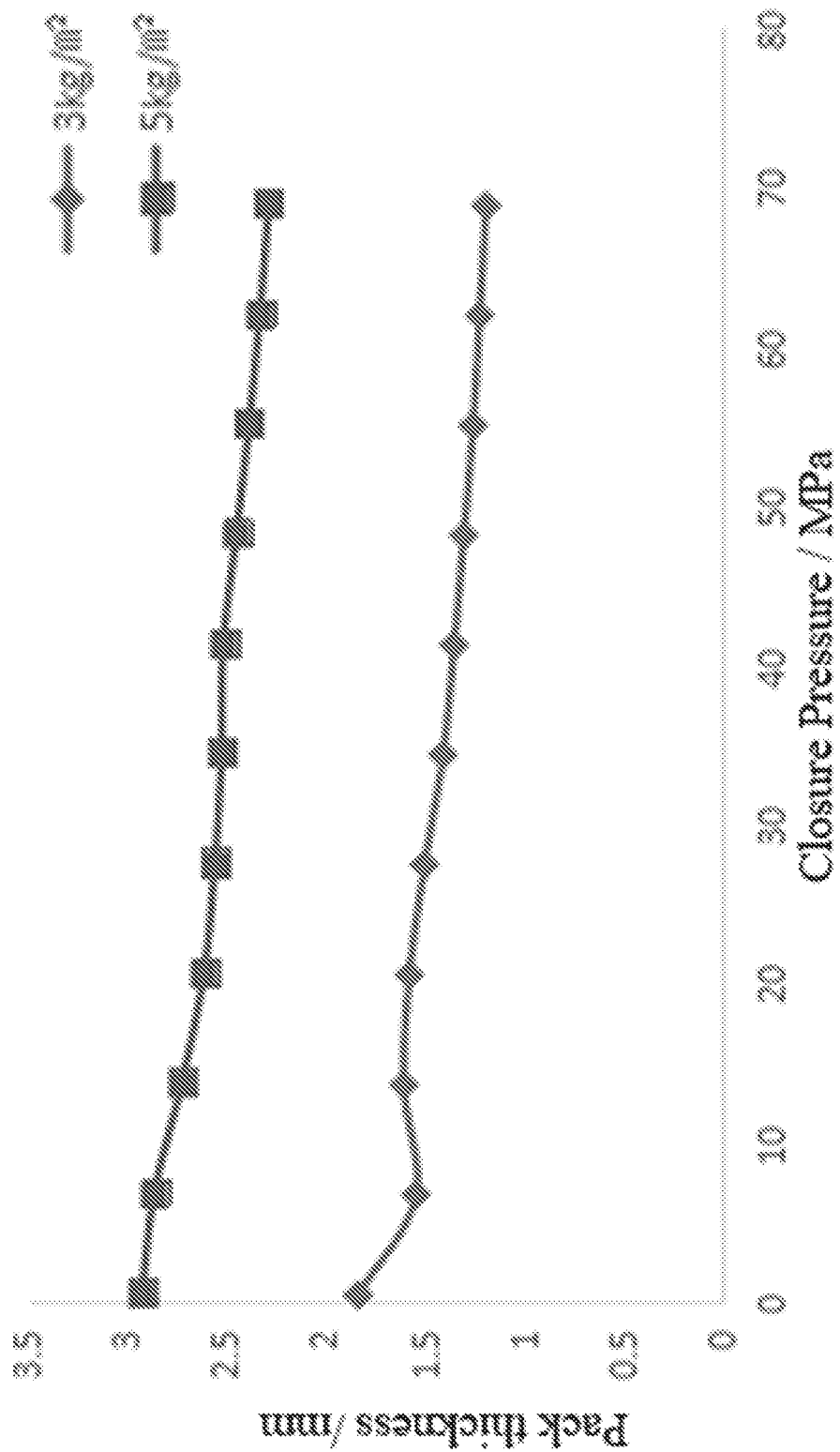
FIG. 7. Curve of Relationship between the Thickness of 1.5:1 Mixture of 20/40-mesh and 30/50-mesh Ceramsite Proppant Pack and the Pressure after Experimental Equipment Calibration.

In order to discuss the relationship between Young's modulus of different meshes of ceramsite proppants mixed in different proportion, 20/40-mesh ceramsite proppants and 30/50-mesh ceramsite proppants are mixed in the proportion of 1:1 and 1.5:1 by mass. The final relationship between the pack thickness with different proppant concentrations and the pressure is shown in FIG. 6 and FIG. 7.

Figure 8:
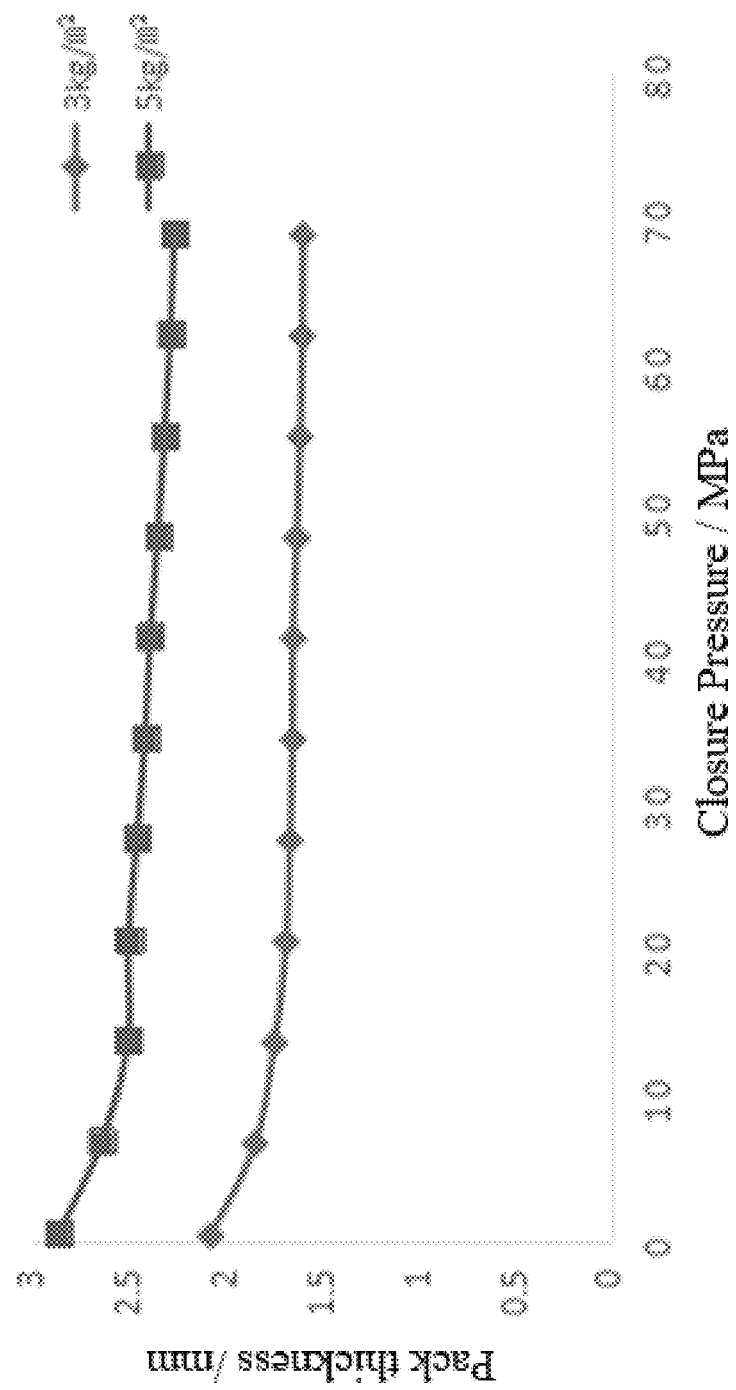
FIG. 8. Curve of Relationship between the Thickness of Quartz Sand and the Pressure after Experimental Equipment Calibration.

(3) In addition to ceramic particle, quartz sand is also one of the common proppants, so quartz sand is also selected for experiments. The results are shown in FIG. 8 below.

As can be learned from the above figure, the relationship between pack thickness and pressure tends to be linear, so Young's modulus is adopted to characterize the proppant pack deformation.

In addition, it can be seen from the above figures that the pack thickness with a proppant concentration of 3 kg/m² may decrease when the pressure increases, indicating that the deformation of equipment without proppant is less than the total deformation of proppant and equipment under the same pressure, which is obviously inconsistent with objective experience. According to the analysis of the experimental process, the main factor may be that the pressure control is not accurate during manual pressing. When the proppant pack is initially pressurized, the real-time pressure of proppant pack is greater than 0.6 MPa, resulting in a large deformation before calibration and a reduction of deformation before 6.9 MPa after calibration. Secondly, when the equipment is installed, the proppant pack is displaced unevenly or the proppant of different sizes is distributed in different ways in the sand, and the proppant pack may be compacted to different levels when the equipment is installed. All of the above factors will affect the calculation of pack thickness, causing errors in the calculation results.

III. Calculation of Young's Modulus of Different Proppant Packs

According to the above experimental data of ceramsite proppants, the variation range of proppant pack thickness is obtained, as shown in Table 2.

TABLE 2

Variation of Fracture Width Propped by Different Proppant Packs

| Proppant concentration (kg/m²) | 20/40 meshes | 30/50 meshes | 40/70 meshes | Mixed particle size 1:1 | Mixed particle size 1.5:1 | Quartz sand |
|---|---|---|---|---|---|---|
| 3 | — | — | 24.1% | — | 35.2% | 23.1% |
| 5 | 40.6% | 8.9% | 18.0% | 27.6% | 21.9% | 21.2% |
| 7 | 25.6% | 10.4% | 10.8% | — | — | — |
| 10 | 15.1% | 4.7% | 4.5% | — | — | — |

After the pack thickness change rule is found, the Young's modulus can be calculated according to its strain and closure pressure. Considering the proppant pack as a whole, the final deformation and strain are calculated according to the corrected data, and the Young's modulus is calculated based on the known stress. Therefore, the Young's modulus of the proppant pack is calculated according to the stress and strain at 69 MPa, as shown in Table 3.

TABLE 3

Young's Modulus of Proppant pack

| Proppant concentration (kg/m²) | 20/40 meshes (MPa) | 30/50 meshes (MPa) | 40/70 meshes (MPa) | Mixed particle size 1:1 (MPa) | Mixed particle size 1.5:1 (MPa) | Quartz sand (MPa) |
|---|---|---|---|---|---|---|
| 3 | — | — | 286.31 | — | 196.27 | 298.40 |
| 5 | 170.00 | 777.71 | 383.30 | 250.06 | 314.71 | 326.78 |
| 7 | 269.74 | 664.81 | 640.94 | — | — | — |
| 10 | 448.49 | 1478.62 | 1523.22 | — | — | — |

Figure 9:
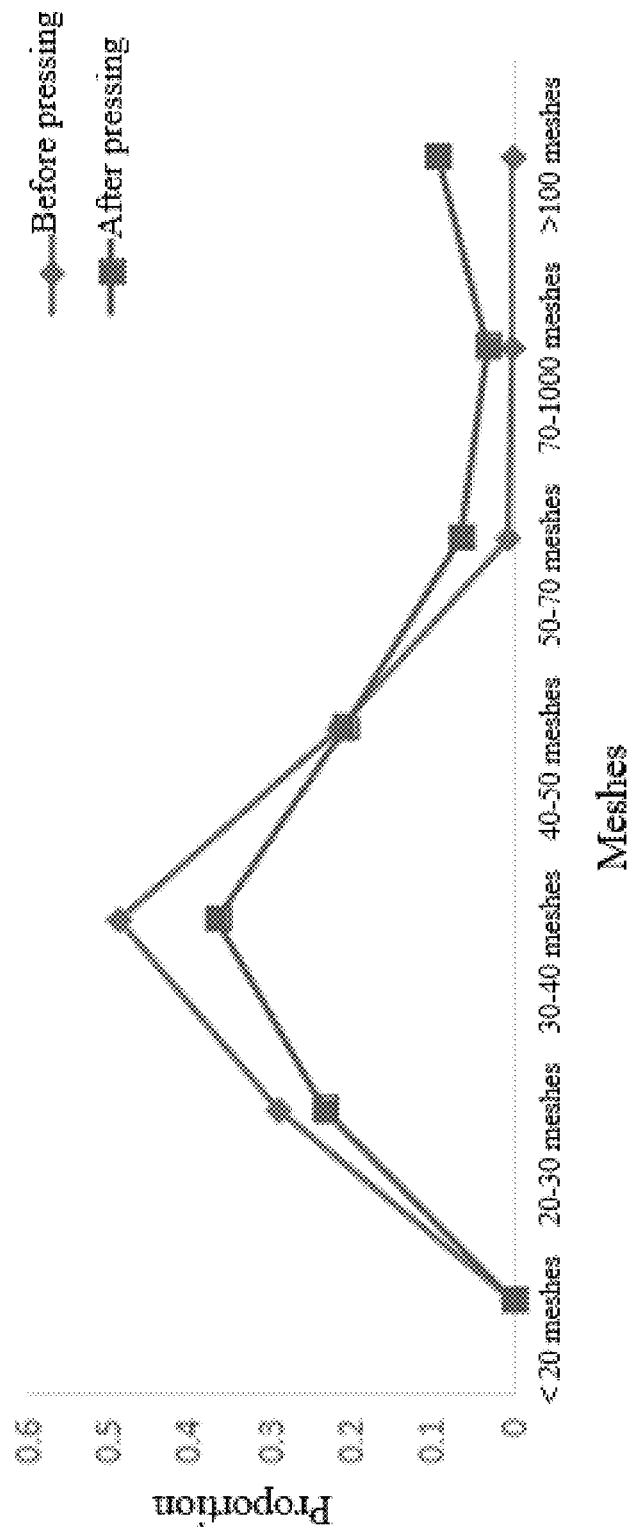
FIG. 9. Comparison of Particle Size Distribution of 20/40-mesh Ceramsite Proppant before and after Pressing.
Figure 10:
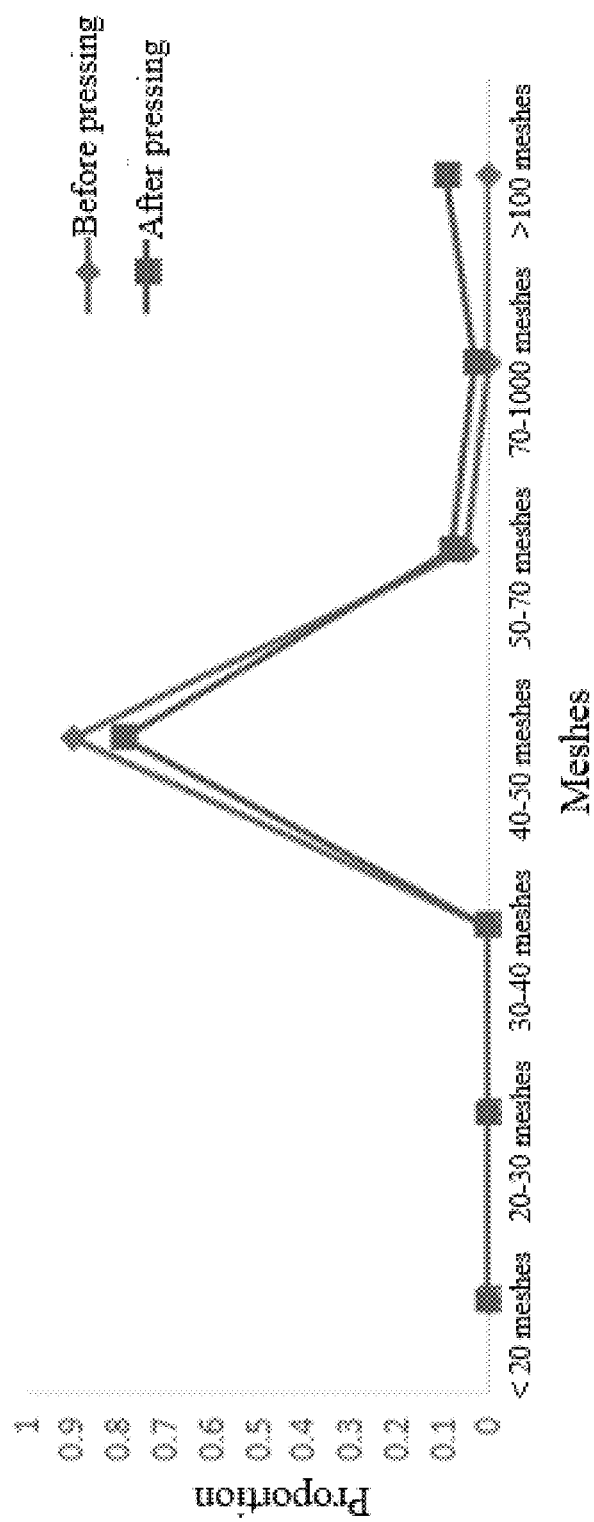
FIG. 10. Comparison of Particle Size Distribution of 30/50-mesh Ceramsite Proppant before and after Pressing.
Figure 11:
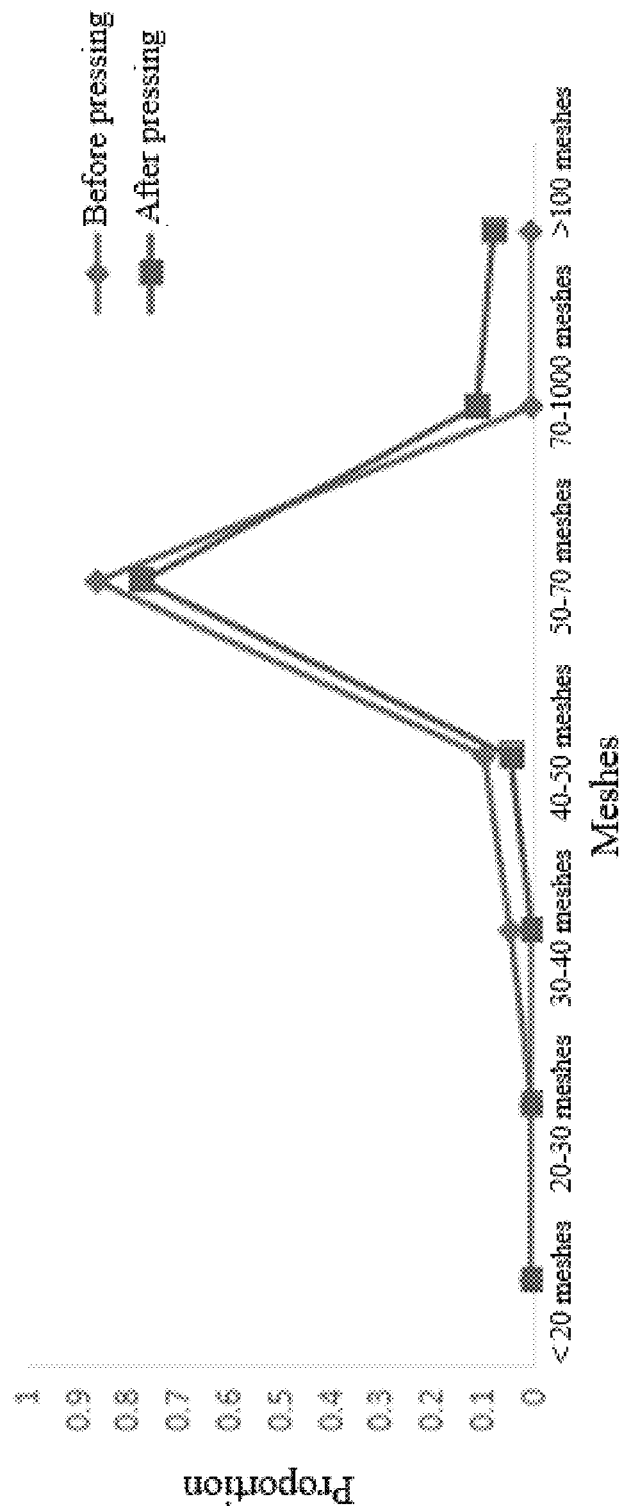
FIG. 11. Comparison of Particle Size Distribution of 40/70-mesh Ceramsite Proppant before and after Pressing.
Figure 12:
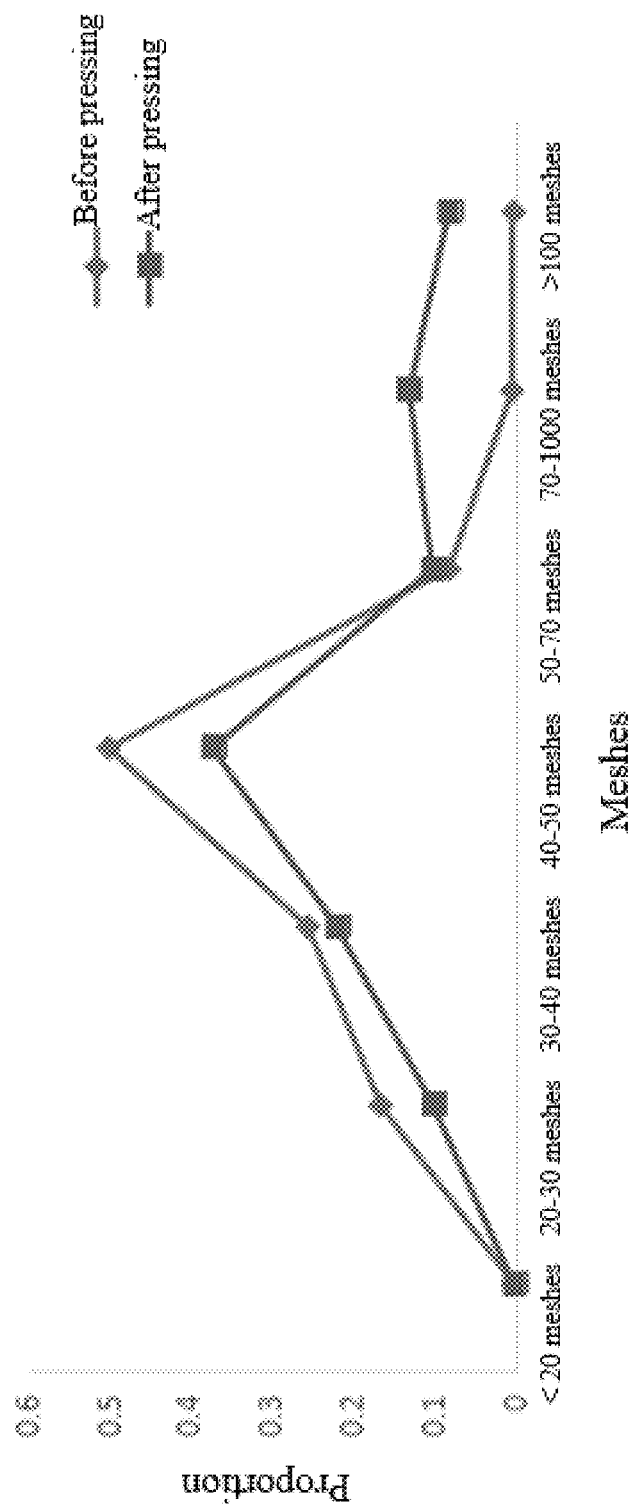
FIG. 12. Comparison of Particle Size Distribution of 1:1 Mixture of 20/40-mesh and 30/50-mesh Ceramsite Proppants before and after Pressing.
Figure 13:
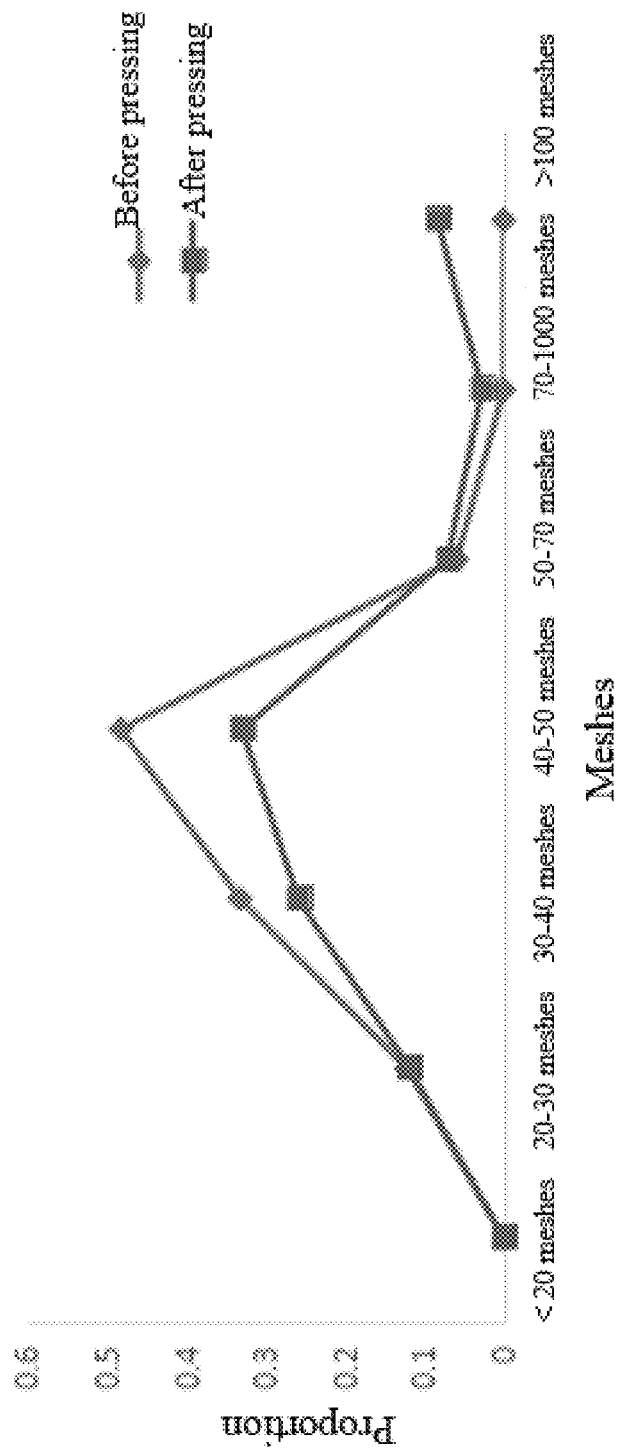
FIG. 13. Comparison of Particle Size Distribution of 1.5:1 Mixture of 20/40-mesh and 30/50-mesh Ceramsite Proppants before and after Pressing.
Figure 14:
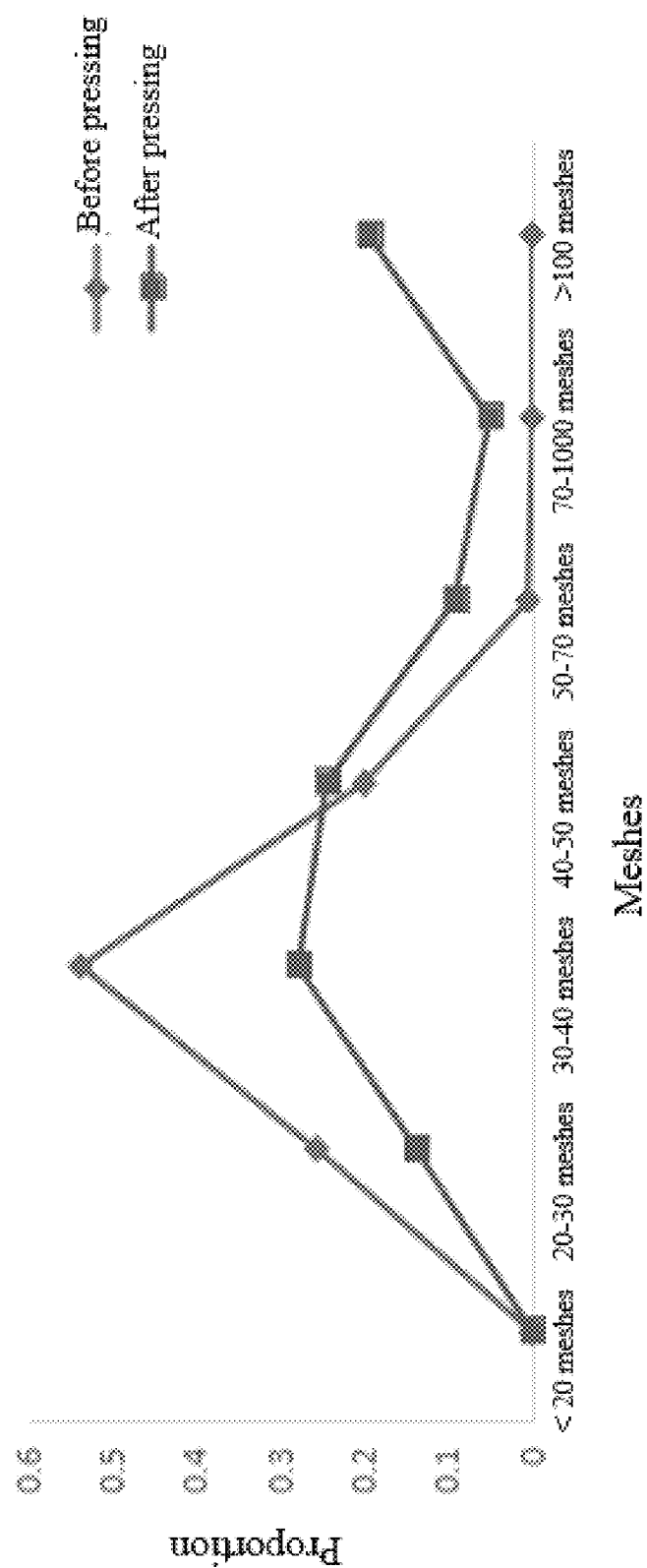
FIG. 14. Comparison of Particle Size Distribution of Quartz Sand with a Proppant Concentration of 3 kg/m2 before and after Pressing.

IV. Particle Size Distribution of Ceramsite Proppant Before and after Pressing (1) In order to obtain the particle size change of the proppant pack, the particle size of the proppant should be screened with electric sieve shaker and 20-mesh, 30-mesh, 40-mesh, 50-mesh, 70-mesh and 100-mesh screens before and after the deformation experiment. Take the ceramsite proppants with concentration of 3 kg/m² as an example. The comparison of the particle size distribution before and after pressing is shown in FIGS. 9 to 13. FIG. 9 shows the Comparison of 20/40-mesh Particle Size Distribution. FIG. 10 shows the Comparison of 30/50-mesh Particle Size Distribution. FIG. 11 shows the Comparison of 40/70-mesh Particle Size Distribution. FIG. 12 shows the Comparison of Particle Size Distribution of 1:1 Mixture of 20/40-mesh and 30/50-mesh Ceramsite Proppants. FIG. 13 shows the Comparison of Particle Size Distribution of 1.5:1 Mixture of 20/40-mesh and 30/50-mesh Ceramsite Proppants. FIG. 14 shows the Comparison of Particle Size Distribution of Quartz Sand with a Proppant Concentration of 3 kg/m² before and after Pressing.

(2) Calculation Method of the Proportion of Crushed Particle Mass

The calculation of the crushing ratio is mainly based on the SY/T5108-2006 standard.

$$\eta = \frac{m_p}{m_c} \times 100\%$$

Where, η refers to proppant crushing ratio;

$m_p$ refers to mass of crushed sample, in g;

$m_c$ refers to mass of proppant sample, in g;

Considering that the reduced mass of particles after pressing must be caused by crushing. The mass of crushed sample in the experiment is calculated by the sum of the difference between the mass of larger particles before and after pressing.

(3) Calculation and Analysis of Crushing Ratio

The crushing ratio of ceramsite at 69 MPa is calculated based on experimental data, as shown in Table 4.

TABLE 4

Crushing Ratio of Ceramsite Proppant

| Proppant concentration (kg/m²) | 20/40 meshes | 30/50 meshes | 40/70 meshes |
|---|---|---|---|
| 3 | 22.7% | 16.5% | 13.1% |
| 5 | 15.8% | 14.5% | 9.7% |
| 7 | 14.3% | 6.6% | 6.5% |
| 10 | 16.1% | 8.2% | 7.8% |

According to the data in the table, the crushing ratio of the proppant with particle size from 20/40 meshes to 40/70 meshes is gradually increased at the same proppant concentration, and it can be concluded that the crushing ratio of the proppant with smaller particle size is lower. The crushing ratio of the same proppant is gradually reduced with the increase of proppant concentration from 3 kg/m² to 7 kg/m², but it is increased when the proppant concentration is 10 kg/m². Therefore, it is estimated that there is a proppant concentration with the lowest crushing ratio among the range from 7 kg/m² to 10 kg/m², and the crushing ratio may be increased if the proppant concentration is higher or lower than the range. Or there are errors in the experimental data, and the crushing ratio is decreased with the increase of proppant concentration.

Table 5 shows the crushing ratio of mixed ceramsite proppants.

TABLE 5

Crushing Ratio of 20/40-mesh and 30/50-mesh Mixed Ceramsite Proppants

| Proppant concentration (kg/m²) | 1:1 | 1.5:1 |
|---|---|---|
| 3 | 17.2% | 17.8% |
| 5 | 13.0% | 16.3% |

Under the lower proppant concentration, the crushing ratio of the mixed ceramsite proppants is decreased with the increase of proppant concentration. The crushing ratio is higher when the mixing ratio of 20/40 meshes to 30/50 meshes is 1.5:1. The amount of larger particles accounts for a higher proportion when the ratio is 1.5:1, so the proppant with a larger particle size may lead to an increase in the crushing ratio.

(3) The crushing ratio of quartz sand is shown in Table 6.

TABLE 6

Crushing Ratio of Quartz Sand

| Proppant concentration (kg/m2) | Crushing ratio |
|---|---|
| 3 | 39.8% |
| 5 | 34.1% |

In the same case, the crushing ratio of quartz sand is lower when the proppant concentration is higher, and the proportion mass of crushed quartz sand is much higher than that of ceramsite when the proppant concentration is the same. In the formation, the crushed residue will block fluid migration, reduce fracture permeability, and reduce fracture conductivity, so quartz sand is not suitable for fracture propping in deeper formations.

The above are only the preferred embodiments of the present invention, and are not intended to limit the present invention in any form. Although the present invention has been disclosed as above with the preferred embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as part of the technical solution of the present invention.

We claim:

1. A method for evaluating the longitudinal deformation of proppant pack, comprising the following steps:

Step 1: Weigh a proppant with total mass $m_c$, use electric sieve shaker and 20-mesh, 30-mesh, 40-mesh, 50-mesh, 70-mesh and 100-mesh screens to screen the proppant by particle size, and record the particle size distribution before pressing the proppant;

Step 2: Displace the proppant evenly on one steel sheet and cover the proppant with another same steel sheet; place pistons on an outer surface of the two steel sheets respectively to form a test unit;

Step 3: Place the test unit fracture conductivity tester, turn on a power supply of the fracture conductivity of tester, compact the proppant pack at a pressure of 0.5 to 0.7 MPa, measure a width between the two steel sheets at four corners of the steel sheet, and average the results;

Step 4: Install left right displacement meters on the fracture conductivity tester, then reset a displacement display, and close an oil return valve on the fracture conductivity tester to make a pump on the fracture conductivity tester turn on;

Step 5: Increase a closure pressure from 6.9 MPa to 69 MPa with an increment of 6.9 MPa/time by a pressure control system of the fracture conductivity tester, record the readings of the left and right displacement meters after the pressure is increased each time and the meter reading is stable, and determine total deformation of the test unit and the proppant;

Step 6: After pressurizing to 69 MPa and recording the data, open the oil return valve to release the pressure, remove the test unit, screen the proppant by particle size with electric sieve shaker and 20-mesh, 30-mesh, 40-mesh, 50-mesh, 70-mesh and 100-mesh screens again, and record the particle size distribution of pressed proppant;

Step 7: Equipment calibration: In the case where no proppant is displaced between the two steel sheets, repeat the proppant deformation experiment, increase the closure pressure from 6.9 MPa to 69 MPa with an increment of 6.9 MPa/time, record the readings of the left and right displacement meters after the pressure is increased each time and the meter reading is stable, determine a deformation of the test unit, and obtain the deformation of proppant pack by subtracting the deformation of the test unit from the total deformation of the experimental equipment and the proppant obtained in Step 5;

Step 8: Plot a curve chart of the relationship between pack thickness and pressure after the equipment calibration, and fit the curve of the pack thickness with the pressure to a straight line; and characterize the proppant pack deformation is determined using the Young's modulus, wherein the calculation formula of Young's modulus is as follows:

$$E = \frac{\sigma}{\varepsilon}$$

Wherein, E refers to Young's modulus, in MPa, $\sigma$ refers to stress to the proppant pack, in MPa, and $\varepsilon$ refers to strain of the proppant pack;

Step 9: Calculate the proppant crushing ratio $\eta$ with the following formula:

$$\eta = \frac{m_p}{m_c} \times 100\%$$

Wherein, $\eta$ refers to proppant crushing ratio, $m_p$ refers to mass of crushed proppant, in g, and $m_c$ refers to total mass of proppant, in g;

wherein the mass $m_p$ of the crushed proppant is equal to the sum of the difference of the mass of all large particles in the proppant before and after pressing.

2. The method for evaluating the longitudinal deformation of proppant pack according to claim 1, wherein in Steps 1 and 6, use electric sieve shaker and 20-mesh, 30-mesh, 40-mesh, 50-mesh, 70-mesh and 100-mesh screens to screen the proppant before and after the pressing, and record the distribution of proppant particle size.

3. The method for evaluating the longitudinal deformation of proppant pack according to claim 1, wherein the steel sheet is 17.8 cm long, 3.8 cm wide and 0.5 mm thick, and its two ends are semicircular.

4. The method for evaluating the longitudinal deformation of proppant pack according to claim 3, wherein when displacing the proppant, first place the steel sheet, displace the proppant on the steel sheet, flatten the proppant with a cross, and then cover the proppant with the another steel sheet.

5. The method for evaluating the longitudinal deformation of proppant pack according to claim 1, wherein in Step 3, compact the proppant pack by manually applying a pressure of 0.6 MPa.

6. The method for evaluating the longitudinal deformation of proppant pack according to claim 1, wherein in Step 1, change the total mass $m_c$ of the weighed proppant, and then conduct the following Steps 2 to 9 to study the longitudinal deformation rule of proppant pack under different proppant concentrations.

* * * * *